United States Patent [19]
O'Donnell et al.

[11] Patent Number: 5,381,494
[45] Date of Patent: Jan. 10, 1995

[54] PACKAGED OPTICAL DEVICES

[75] Inventors: Adrian C. O'Donnell; Jake D. Dodson, both of Chelmsford, England

[73] Assignee: Integrated Optical Components Ltd., Essex, England

[21] Appl. No.: 95,812

[22] Filed: Jul. 2, 1993

[30] Foreign Application Priority Data

Jul. 13, 1992 [GB] United Kingdom ............... 9214813

[51] Int. Cl.⁶ ............................................. E02B 6/30
[52] U.S. Cl. ................................. 385/49; 385/51; 385/52; 385/89; 385/91
[58] Field of Search .................... 385/49, 51, 52, 88, 385/89, 90, 91, 92, 94, 138, 65, 83

[56] References Cited

U.S. PATENT DOCUMENTS

| | | | |
|---|---|---|---|
| 4,199,363 | 10/1978 | Camlibel et al. | 385/138 X |
| 4,744,619 | 5/1988 | Cameron | 385/49 X |
| 4,772,086 | 9/1988 | Bellerby et al. | 385/49 X |
| 4,902,091 | 2/1990 | Althaus et al. | 385/138 |
| 5,073,002 | 12/1991 | Hockaday | 385/49 |
| 5,185,846 | 2/1993 | Basavanhally et al. | 385/137 |
| 5,239,603 | 8/1993 | Sonoda et al. | 385/70 |
| 5,260,587 | 11/1993 | Sato | 257/88 |

*Primary Examiner*—Frank Gonzalez
*Attorney, Agent, or Firm*—McGlew and Tuttle

[57] ABSTRACT

A packaged optical device with an integrated optical component mounted within a housing which includes an end wall confronting a cheek of the component to which an optical fiber is to be connected to communicate with an internal structure of the component. The wall has an aperture in which is mounted an elongate rigid ferrule through which the optical fiber extends, so that the end faces of the fibre and ferrule are co-planar. After the ferrule has been manipulated externally of the housing to align the fibre with the component structure, the ferrule is secured in position by a UV setting adhesive. The end face of the ferrule may be adhered to the cheek of the component to maintain the alignment.

18 Claims, 1 Drawing Sheet

PACKAGED OPTICAL DEVICES

FIELD OF THE INVENTION

This invention relates to a packaged optical device for use with optical fibres, such as an integrated (solid state) opto electronic switch or modulator; and also to a method of providing a packaged optical component with at least one optical fibre extending out of the package and connected to the component.

BACKGROUND OF THE INVENTION

The telecommunications industry is making ever more use of optical fibre technology, for the transmission of digital and analogue signals over extended distances. By increasing the power of the transmitted light, the distance over which a signal may be transmitted through a fibre may be increased, but this calls for equipment able to modulate high-powered light beams. For this purpose, it is known to use opto-electronic modulators, or integrated optical devices using lithium-niobate technology.

For ease of use of opto-electronic devices, it is usually convenient to provide the devices with so-called pig-tails, in the form of one or a bundle of optical fibres appropriately terminated to the component itself by the device manufacturer, in order to ensure the optimum coupling thereto. The end user then merely has to connect his optical fibre cable to the pig-tail, which is a relatively simple operation and appropriate designs of coupler are well-known for this purpose.

Advantageously, devices including opto-electronic components are located in sealed packages, hermetic or otherwise, to minimise the effect of the ambient on the component. However, in order to allow sufficient access for one or more optical fibres to be coupled to a component within an overall sealing envelope, it is necessary for that envelope to be of a significantly greater volume than that of the component to which the optical fibres are to be coupled, in order to give sufficient access to the end portions of the optical fibres whereby they may appropriately be terminated on the component.

SUMMARY AND OBJECTS OF THE INVENTION

It is an aim of the present invention to provide a packaged optical device having an optical component coupled to at least one optical fibre, which device has a housing for the component, the housing being significantly smaller than those employed with prior art devices using similar optical components. It is a further aim of the invention to provide a method of manufacturing a packaged optical component of the kind just described.

According to one aspect of the present invention, there is provided a packaged optical device for use with optical fibres, which comprises a housing, and an optical component mounted within the housing. The optical component has an internal light-transfer structure (which may be a wave guide) and an external cheek with which the structure communicates and to which an external optical fibre is coupled. The housing has a wall provided with an aperture facing the cheek of the component. A substantially rigid elongate ferrule having an end face is provided and is adapted for mounting in the aperture with the end face of the ferrule abutting the cheek of the component. An optical fibre extends through the ferrule and the fibre has an end face. The fibre is arranged so that the end face thereof lies substantially co-planar with the end face of the ferrule. Means are also provided for mounting the ferrule in the aperture in the housing wall with the end faces of the ferrule and optical fibre in abutment with the cheek of the optical component and the optical fibre in communication with the structure in the component.

It will be appreciated that in the packaged optical device of the present invention, an elongate ferrule is used to support an optical fibre which couples with the optical component. Since the ferrule is both substantially rigid and elongate, the ferrule itself may be used to adjust the alignment of the optical fibre with the component, from outside the packaging envelope, to optimise the coupling therewith, and when that is achieved, the ferrule is secured in the aperture in the housing wall, to maintain the alignment of the optical fibre with the component. Thus, there is no need for access to the free end of the optical fibre in order to optimise the coupling thereof with the optical component and so the spacing between the optical component and its housing may greatly be reduced, as compared to the prior art arrangements where access is required.

According to a second aspect of this invention, the packaged optical device has an optical component mounted within a housing having a wall facing the component and formed with an aperture. There is a method for providing the device with at least one optical fibre extending through said aperture in the housing and for the fibre to be in communication with an internal structure in the component. This method comprises mounting the optical fibre within a substantially rigid ferrule with the end face of the fibre substantially aligned with the end face of the ferrule, passing the ferrule through the aperture so that the end face of the ferrule abuts the component, manipulating the ferrule from outside the package until the fibre is aligned with an internal structure within the component, and then securing the ferrule in the required position by joining the ferrule to the housing wall.

During the manufacturing method, the end face of the ferrule may additionally be secured to the component. Both the securing of the ferrule to the housing wall and, if performed, to the component may be effected by means of a UV curing adhesive, and following the manufacturing process of this invention as described above, the package may be filled with a potting compound, so as permanently to hold the or each fibre optic properly coupled with the component.

By way of example only, certain specific embodiments of packaged optical devices constructed and arranged in accordance with the present invention will now be described in detail, reference being made to the accompanying drawings.

DESCRIPTION OF THE PREFERRED EMBODIMENT

In the packaged optical device of this invention, the ferrule may be secured in the aperture in the housing wall by a glass sealing technique, soldering, laser welding, or some such similar process, depending upon the materials employed for the housing wall and the ferrule. The most preferred arrangement employs the use of an adhesive, and preferably an epoxy adhesive adapted to cure on exposure to ultra violet radiation. Which ever technique is employed for this purpose, it should be capable of forming a hermetic seal between the ferrule and the housing wall.

The ferrule may in addition be adhered to the cheek of the component against which the ferrule abuts, in order to assist the maintenance of the optimized coupling of the optical fibre with the component. Again, this may be achieved by means of an adhesive, and preferably an adhesive which cures on exposure to ultra violet radiation.

The ferrule may ideally be fabricated from a ceramic material, but could be made of glass, metal or a plastics material. The end portion of the ferrule which abuts the components may be cut away to define a generally V-shaped groove along which the optical fibre extends. It may be appropriate to have an insert fitted into the cut-away portion of the ferrule, with the generally V-shaped groove being formed in and defined by the insert. In either case, a clamping block may be fitted over the cut-away end portion of the ferrule, to clamp the optical fibre in the V-shaped groove. Such a block may itself have a corresponding generally V-shaped groove, with the optical fibre extending therealong.

Depending upon the nature of the optical component, a plurality of optical fibres may extend in a substantially parallel manner through the ferrule, side-by-side in one plane or in some other configuration, depending upon the requirements of the component with which the fibres are to couple.

Once each optical fibre has been coupled to the component and the ferrule secured in position, the device may be completed by filling the housing with an appropriate potting compound. This will serve to maintain the coupling of each fibre with the component, notwithstanding physical shocks to which the device may be subjected when in use.

Figure 1:
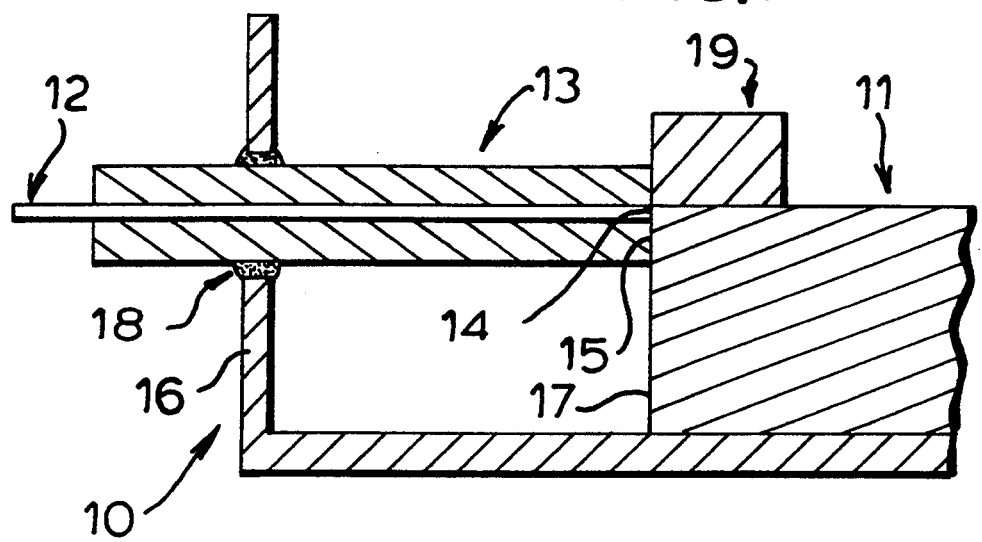
FIG. 1 is a diagrammatic sectional part-view of a first device.

Referring now to the drawings, which show actual embodiments of this invention, FIG. 1 shows part of an opto-electronic device comprising a package housing supporting an optical component 11, for example in the form of a lithium niobate modulator, for modulating a beam of light fed from an optical fibre into the component, the modulated beam then being fed from the component into another optical fibre. Such lithium niobate modulator technology is well known and understood by those skilled in the art and forms no part of the present invention, as such; it will not therefore be discussed in further detail here.

The optical fibres carrying the in-coming and out-going beams have to be coupled to wave guides within the optical component 11 with a high degree of alignment accuracy and for proper operation of the device as a whole, that alignment has to be maintained for the life of the device. In the embodiment of the invention illustrated in FIG. 1, the alignment is achieved by furnishing an in-coming (or out-going) optical fibre 12 with a rigid elongate ferrule 13 through which the fibre passes. The fibre is secured within that ferrule with the end face 14 of the fibre substantially in alignment with the inner end face 15 of the ferrule 13. It may be sufficient to leave the fibre in its as-cleaved state, or it could be finished to have a lens profile. More usually, the ferrule together with the optical fibre assembled therein would be polished to a very fine finish, with the optical fibre polished flush with the end face 14 of the ferrule, in a true radial plane. Other possibilities include finishing the ferrule and optical fibre with an angled, bevelled or spherical shape, to improve the coupling performance.

The package housing has a side wall 16 upstanding from the base wall thereof, so as to lie substantiality parallel to an end cheek 17 of the optical component 11. An aperture is formed through the side wall 16 substantially co-axially with a wave guide (not shown) within the optical component 11, and with which the optical fibre 12 is to couple. The ferrule 13 is then inserted through the aperture in the side wall 16 until the end face 15 of the ferrule abuts the cheek 17 of the component 11 and the ferrule is then manipulated appropriately in order to optimise the coupling between the fibre 12 and the wave guide 11 in the component. Such manipulation may be performed mechanically, externally of the package housing 10, using the portion of the ferrule projecting externally beyond the side wall 16 of the housing.

The ferrule itself is preferably made of a ceramic material, though other rigid materials could be used, such as glass, metal or a plastics.

Once the fibre-to-component coupling has been optimised, the ferrule is secured in position by a bead 18 of an epoxy resin to bond the ferrule 13 to the side wall 16 of the package housing. Conveniently, an ultra violet radiation curing resin is employed for that purpose. A film of similar adhesive would normally also be applied to the end face 15 of the ferrule 13, whereby that adhesive may also be cured on exposure to ultra violet radiation so as to hold the end face 15 of the ferrule in the required position on the cheek 17 of the component.

As illustrated in FIG. 1, a component 11 such as a lithium niobate modulator may include a coupling block 19 disposed over the wave guide, and in this case the end face 15 of the ferrule may also be bonded to the block 19.

Once the coupling has been completed and the resin cured, the free space within the package housing 10 may be filled with an appropriate grade of potting compound, so as to complete the device. It will be appreciated that the component 11 includes electrical connecting pins which will project laterally from the housing 10, but which pins are not shown in the drawings, for the sake of clarity.

Figure 2:
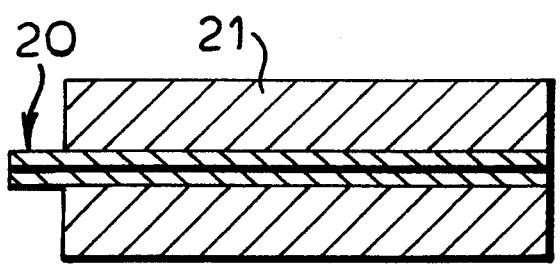
FIG. 2 is a view of an alternative ferrule accommodating a plurality of optical fibres.
Figure 3:
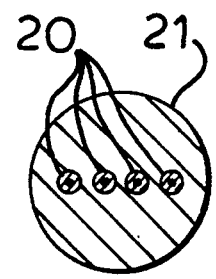
FIG. 3 is an end view on the ferrule of FIG. 2.

FIGS. 2 and 3 show an alternative ferrule design, adapted to hold four individual optical fibres 20 extending in a parallel disposition in a common plane. The ferrule 21 maintains the four fibres 20 in an accurate relative disposition, whereby all four fibres may simultaneously be optimally coupled to corresponding wave guides in the component 11. In all other respects the use of the ferrule of FIGS. 2 and 3 corresponds to that described above with reference to FIG. 1.

Figure 4:
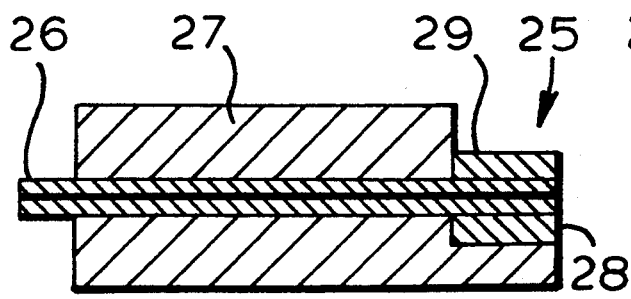
FIGS. 4 and 5 are views corresponding to those of FIGS. 2 and 3, but of another ferrule design.
Figure 5:
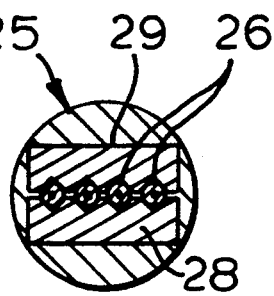

FIGS. 4 and 5 show yet another ferrule design, using a V-groove assembly 25 to accurately hold the forward ends of four optical fibres 26. The ferrule 27 defines a cut-away portion at its front end, and an insert 28 is secured to the cut-away portion of the ferrule, which insert has four parallel V-grooves in its upper face. The optical fibres are laid along those V-grooves and then a clamping block 29, having corresponding V-grooves in its lower face, is secured in position on the insert 28, so as to securely hold the four optical fibres in the disposition defined by the V-grooves in the insert 28 and clamping block 29.

Once the ferrule has been assembled with the optical fibres, using the insert 28 and block 29, the ferrule is used in the same manner as has been described above with reference to FIG. 1.

It will be appreciated that the described embodiments provide a robust assembly for coupling optical fibres to an optical (or opto-electronic) component, which assembly simultaneously provides a feed-through for the fibres, through the package wall. The assembly is simple to perform and allows external manipulation of the fibres, without the need to place clamps or the like within the package, so permitting reduced over package dimensions.

We claim:

1. A connection between an optical component and an optical fiber, the connection comprising:
   a housing mounting said the optical component, said housing including a side wall facing a cheek of the optical component, the optical component having an internal light-transfer structure terminating at the cheek, said side wall defining an aperture facing the cheek;
   a ferrule positioned around an end of the optical fiber, said ferrule having an end face positioned substantially co-planar with an end face of the optical fiber, said end faces of said ferrule and the optical fiber abutting the cheek of the optical component, said ferrule also having a portion positioned in said aperture of said side wall;
   fastening means for mounting said ferrule in said aperture and holding said end faces of said ferrule and the optical fiber in abutment with the cheek of the optical component to cause the optical fiber to be in optical communication with the internal light transfer structure.

2. A connection in accordance with claim 1, wherein:
said fastening means is one of adhesive, welding, soldering and glass-sealing.

3. A connection in accordance with claim 1, wherein:
said fastening means is an adhesive which cures on exposure to ultra-violet radiation.

4. A connection in accordance with claim 1, wherein:
said fastening means is an adhesive and forms an hermetic seal between said ferrule and said side wall.

5. A connection in accordance with claim 1, further comprising:
another fastening means for fastening said end face of said ferrule to said cheek of the optical component.

6. A connection in accordance with claim 1, wherein:
said ferrule has an end portion adjacent said end face, and said end portion defines a cut-away portion and a substantially v-shaped groove along which the optical fiber extends.

7. A connection in accordance with claim 6, further comprising:
a clamping block positioned in said cut-away portion of said ferrule, said clamping block defining a substantially v-shaped groove which corresponds and is positioned substantially opposite to said v-shaped groove defined by said end portion of said ferrule.

8. A connection in accordance with claim 1, wherein:
said ferrule has an end portion adjacent said end face, said end portion defines a cut-away portion, and said ferrule includes an insert positioned in said cut-away portion, said insert defining a substantially v-shaped groove along which the optical fiber extends.

9. A connection in accordance with claim 1, wherein:
the optical component includes a plurality of internal light-transfer structures all terminating at the cheek of the optical component; and
said ferrule includes a plurality of the optical fibers positioned in respective optical communication through the cheek with the plurality of internal light-transfer structures of the component.

10. A connection in accordance with claim 1, wherein:
said side wall of the housing is spaced from the optical component and a potting compound is positioned between said side wall and the optical component.

11. A connection in accordance with claim 1, wherein:
the optical component includes an internal light-transfer structure terminating at the cheek of the optical component;
said aperture defined by said side wall is substantially coaxial with wave guide means; and
said ferrule is substantially rigid.

12. A connection in accordance with claim 9, wherein:
said ferrule positions the plurality of optical fibers in a substantially parallel arrangement.

13. A connection between an optical component and an optical fiber, the connection comprising:
   a housing mounting said optical component, said housing including a side wall facing a cheek of the optical component, the optical component having an internal light-transfer structure terminating at the cheek, said side wall defining an aperture facing the cheek;
   a ferrule positioned around an end of the optical fiber, said ferrule having an end face positioned substantially co-planar with an end face of the optical fiber, said end face of said ferrule and the optical fiber abutting the cheek of the optical component, said ferrule also having a portion positioned in said aperture of said side wall; and
   fastening means for mounting said ferrule in said aperture and holding said end faces of said ferrule and the optical fiber in abutment with the cheek of the optical component to cause the optical fiber to be in communication with the optical component, said fastening means being an adhesive which cures on exposure to ultraviolet radiation and forms an hermetic seal between said ferrule and said side wall, said fastening means also fastening said end face of said ferrule to said cheek of the optical component.

14. A connection in accordance with claim 13, wherein:
said ferrule has an end portion adjacent said end face, said end portion defines a cut-away portion and a substantially v-shaped groove along which the optical fiber extends.

15. A connection in accordance with claim 13, further comprising:
a clamping block positioned in said cut-away portion of said ferrule, said clamping block defining a substantially v-shaped groove which corresponds and is positioned substantially opposite to said v-shaped grooves defined by said end portion of said ferrule.

16. A connection in accordance with claim 13, wherein:

said ferrule has an end portion adjacent said end face, said end portion defines a cut-away portion, and said ferrule also includes an insert positioned in said cut-away portion, said insert defining a substantially v-shaped groove along which the optical fiber extends.

17. A connection in accordance with claim 13, wherein:

the optical component includes a plurality of internal light-transfer structures all terminating at the cheek of the optical component; and said ferrule includes a plurality of the optical fibers positioned in respective optical communication through the cheek with the plurality of internal light-transfer structures of the component.

18. A method for connecting an optical component and an optical fiber, the method comprising the steps of:

mounting a housing onto the optical component, said housing including a side wall facing a cheek of the optical component, the optical component having an internal light-transfer structure for optical communication though the cheek, said side wall defining an aperture facing the cheek;

mounting a ferrule around an end of the optical fiber to have an end face of said ferrule positioned substantially co-planar with an end face of the optical fiber;

passing said ferrule through said aperture of said side wall and positioning said end face of said ferrule and the optical fiber to abut the cheek of the optical component:

manipulating said ferrule from a side of said side wall substantially opposite the optical component to align the optical fiber with the internal light-transfer structure; and securing said ferrule to said side wall to maintain the optical fiber in said alignment with the internal light-transfer structure.

* * * * *